(12) United States Patent
Kim et al.

(10) Patent No.: US 7,910,239 B2
(45) Date of Patent: Mar. 22, 2011

(54) RECHARGEABLE BATTERY AND BATTERY MODULE USING THE SAME

(75) Inventors: Tae-Yong Kim, Suwon-si (KR); Sang-Won Byun, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 209 days.

(21) Appl. No.: 11/769,570

(22) Filed: Jun. 27, 2007

(65) Prior Publication Data

US 2008/0085447 A1    Apr. 10, 2008

(30) Foreign Application Priority Data

Oct. 10, 2006  (KR) .................. 10-2006-0098527
Oct. 10, 2006  (KR) .................. 10-2006-0098529

(51) Int. Cl.
*H01M 2/20* (2006.01)
(52) U.S. Cl. ........ 429/121; 429/161; 429/164; 429/170; 429/178
(58) Field of Classification Search .............. 429/121, 429/164, 170, 178, 161
See application file for complete search history.

(56) References Cited

U.S. PATENT DOCUMENTS

| | | | |
|---|---|---|---|
| 5,578,392 | A | 11/1996 | Kawamura |
| 5,849,431 | A | 12/1998 | Kita et al. |
| 6,071,638 | A | 6/2000 | Fradin |
| 6,399,237 | B1 | 6/2002 | Souliac et al. |
| 6,884,541 | B2 | 4/2005 | Enomoto et al. |
| 2006/0105624 | A1 | 5/2006 | Yoshikane et al. |

FOREIGN PATENT DOCUMENTS

| | | |
|---|---|---|
| CN | 1134042 A | 10/1996 |
| EP | 0822605 A2 | 2/1998 |
| EP | 1067610 A1 | 1/2001 |
| EP | 1205985 A1 | 5/2002 |
| JP | 08-222201 | 8/1996 |
| JP | 08-287898 | 11/1996 |
| JP | 1998-083805 | 3/1998 |
| JP | 2000-106164 | 4/2000 |
| JP | 2001-052759 | 2/2001 |
| JP | 2001-135358 | 5/2001 |
| JP | 2002-260631 | 9/2002 |
| JP | 2006-147319 | 6/2006 |
| JP | 2006-185926 | 7/2006 |

OTHER PUBLICATIONS

Search Report issued Sep. 21, 2007 in corresponding European patent application No. 07114931.4 in 5 pages.

*Primary Examiner* — Jane Rhee
(74) *Attorney, Agent, or Firm* — Knobbe Martens Olson & Bear PLC

(57) ABSTRACT

Disclosed are a battery module of which positive and negative electrodes can be readily discriminated from each other in a short time and a manufacturing process can be simplified, and a battery module using the same. A rechargeable battery includes: an electrode assembly including positive and negative electrodes, and a separator interposed between the positive and negative electrodes; a casing having an opened top face to store the electrode assembly; a cap assembly installed in an upper portion of the casing; an upper connection cap which has a female member and is fixed to the cap assembly; and a lower connection cap which has a male member and is fixed to a lower portion of the casing. The female member may be clinched to the upper connection cap, and the male member may be clinched to the lower connection cap.

20 Claims, 8 Drawing Sheets

RECHARGEABLE BATTERY AND BATTERY MODULE USING THE SAME

CROSS-REFERENCES TO RELATED APPLICATIONS

This application claims priority to and the benefit of Korean Patent Applications Nos. 10-2006-0098527 and 10-2006-0098529 both filed in the Korean Intellectual Property Office on Oct. 10, 2006, the entire contents of which are incorporated herein by reference.

BACKGROUND OF THE INVENTION

1. Field of the Invention

The invention relates to a rechargeable battery and a battery module using the same, and more particularly, to a rechargeable battery of which positive and negative electrodes can be readily discriminated from each other in a short time and a manufacturing process can be simplified, and a battery module using the same.

2. Description of the Related Art

Generally, a battery module includes a few or several tens rechargeable batteries connected with one another. The rechargeable battery can be repeatedly charged and discharged because its chemical and electrical energy conversion is reversible. Recently, more and more mobile wireless electronic products are being developed, and necessity of the rechargeable battery having a high energy density increases as their sizes are miniaturized and their weights are reduced.

Widely used batteries include a nickel-cadmium battery, a nickel-hydrogen battery, a lithium battery, and the like. Particularly, the lithium rechargeable battery has an operation voltage of 3.6 V, which is triple that of the nickel-cadmium battery or the nickel-hydrogen battery, and also has a high energy density per unit weight. Therefore, the lithium rechargeable battery is being rapidly popularized as a power supply of mobile electronic devices. Such a lithium rechargeable battery can be classified into a lithium ion rechargeable battery, a lithium ion polymer battery, and a lithium polymer battery. While the lithium polymer battery is nearly similar to the lithium ion rechargeable battery, electrolyte of the lithium ion rechargeable battery is substituted with polymer. It contributes to flexibility of design in the shape as well as higher safety.

A typical rechargeable battery includes an electrode assembly having a positive electrode, a negative electrode, and a separator interposed therebetween, a casing providing a space for storing the electrode assembly, and a cap plate combined with the casing to seal the electrode assembly. Each of the positive and negative electrodes includes a coated portion where an activation material is coated and an uncoated portion where the activation material is not coated. The uncoated portion is provided to collect the current generated in the positive and negative electrodes, and a conductive tap is attached thereto. The conductive tap induces the current generated in the positive and negative electrodes to the positive and negative terminals, respectively. The rechargeable battery may be manufactured in a variety of shapes such as cylindrical, rectangular, and pouch types depending on the shapes of the electrode assembly and the casing.

The battery module having a plurality of rechargeable batteries connected with one another as described above is being widely used as a power supply for driving motors of portable miniaturized electronic devices such as mobile phones, personal computers, and camcorders, and hybrid electric vehicles.

When the rechargeable batteries are combined with one another to provide a battery module, they are arranged in series such that a positive electrode terminal of one of the rechargeable batteries and a negative electrode terminal of the adjacent rechargeable battery face the same direction. Then, the positive and negative electrode terminals are connected with each other using an interconnection member. The interconnection member may be fixed by a fastening mechanism such as a nut.

During a process of manufacturing the battery module, the positive and negative electrodes of the rechargeable batteries should be readily discriminated in a short time. If they cannot be readily discriminated, the interconnection member may be erroneously inserted. Therefore, the manufacturing process should be very carefully performed. As a result, it took a long time to manufacture the battery module, and thus, productivity was degraded.

SUMMARY

As an embodiment of the invention, a rechargeable battery device is provided. The device comprises: an electric cell comprising a casing, a positive electrode, and a negative electrode; a top connection cap electrically connected to the positive electrode; and a bottom connection cap electrically connected to the negative electrode. The top connection cap comprises a first mechanical fastener of a first kind, wherein the bottom connection cap comprises a second mechanical fastener of a second kind, said first and second kinds of mechanical fasteners being adapted to fasten in different manners.

The first mechanical fastener may comprise a female member, and wherein the second mechanical fastener comprises a male member. The female member may comprise a nut, wherein the nut comprises: a head; a threaded hole; and a locking portion extended from the head.

The top connection cap may further comprise: a first base section which is fixed to the positive electrode and comprises a center hole; and a first support section which protrudes from the first base section and comprises a top portion, a side portion, and a center hole provided on the top portion.

The nut may be clinched to the first support section, and wherein the locking portion of the nut is clinched to the center hole of the first support section. The nut is combined with the top connection cap by a forced insertion into the center hole of the first support section, and wherein the mechanical strength of the first support section is lower than the that of the locking portion of the nut.

The bolt may comprise: a head; a locking portion extended from the head; and a threaded pole. The bottom connection cap may further comprise: a second base section which is fixed to the negative electrode and comprises a center hole; and a second support section which protrudes from the second base section and comprises a top portion, a side portion, and a center hole provided on the top portion.

The bolt may be clinched to the center hole of the second support section, wherein the locking portion of the bolt is clinched to the second support section. The bolt may be combined with the bottom connection cap by a forced insertion into the center hole of the second support section, and wherein the mechanical strength of the second support section is lower than the that of the locking portion of the bolt.

As anther embodiment of the invention, a battery module device is provided. The device comprises: a plurality of rechargeable batteries of the above comprising a first battery and a second battery; and one or more interconnection members, one of which detachably interconnects an electrode of the first battery and an electrode of the second battery electrically and mechanically. The interconnection member may comprise a first connecting portion and a second connecting portion. The first mechanical fastener may comprise a female member, and wherein the second mechanical fastener comprises a male member. The first connecting portion may be configured to be connected to the female member, and wherein the second connecting portion is configured to be connected to the male member.

The first connecting portion may be configured to be connected to the male member, and wherein the second connecting portion is configured to be connected to the male member. The first connecting portion may be configured to be connected to the female member, and wherein the second connecting portion is configured to be connected to the female member.

The female member may comprise a nut, wherein the male member comprises a bolt. The interconnection member may be detachably combined with the upper and lower connection caps using a fixation device. The interconnection member includes: a first thru-hole connected with a hole of the nut; and a second thru-hole into which the bolt is inserted. The fixation device may include a fixation bolt which is inserted into the first thru-hole and combined with the nut and a fixation nut combined with the bolt.

As a still another embodiment of the invention, a battery module device is provided. The device comprises: a first battery of the above; a second battery of the above; a third battery of the above; a first interconnection member comprising first and second connecting portions; a second interconnection member comprising first and second connecting portions; a third interconnection member comprising first and second connecting portions; and a fourth interconnection member comprising first and second connecting portions.

The second connecting portion of the first interconnection member may be connected to the top connection cap of the first battery, wherein the first connecting portion of the second interconnection member is connected to the bottom connection cap of the first battery, wherein the second connecting portion of the second interconnection member is connected to the top connection cap of the second battery, wherein the first connecting portion of the third interconnection member is connected to the bottom connection cap of the second battery, wherein the second connecting portion of the third interconnection member is connected to the top connection cap of the third battery, and wherein the first connecting portion of the fourth interconnection member is connected to the bottom connection cap of the third battery.

The invention provides a rechargeable battery of which positive and negative electrodes can be readily discriminated from each other in a short time, and a manufacturing process can be simplified to reduce a manufacturing time, and a battery module using the same.

According to an aspect of the invention, there is provided a rechargeable battery comprising: i) an electrode assembly including positive and negative electrodes, and a separator interposed between the positive and negative electrodes; ii) a casing having an opened top face to store the electrode assembly; iii) a cap assembly installed in an upper portion of the casing; iv) an upper connection cap which has a female member and is fixed to the cap assembly; and v) a lower connection cap which has a male member and is fixed to a lower portion of the casing.

The upper connection cap may include: a first base section which is fixed to the cap assembly and has a hole in its center; and a first support section protruded from an inner circumference of the first base section. The first base section may be welded to the cap assembly. The welding may be resistance welding or laser welding. At least one degassing hole may be formed in the side face of the first support section. The female member may be fixed to an inner surface of the first support section. Furthermore, the female member may be clinched to the first support section.

The lower connection cap may include: a second base section which is fixed to a lower surface of the casing and has a hole in its center; and a second support section protruded from an inner circumference of the second base section. The second base section may be welded to a lower surface of the casing. The welding may be resistance welding or laser welding. The male member may be fixed to an inner surface of the second support section. Furthermore, the female member may be clinched to the second support section.

The female member may be a nut clinched to the upper connection cap. In this case, the nut may include: a head; a first protrusion combined with a surface of the head; a second protrusion combined with a surface of the first protrusion; and a third protrusion combined with a surface of the second protrusion, and wherein the second protrusion has a diameter smaller than those of the first and third protrusions to provide a receive portion between the first and third protrusions. The nut may be combined with the upper connection cap by forcible insertion, and the receive portion may be filled with a material of the upper connection cap. The mechanical strength of the upper connection cap may be smaller than that of the nut.

The male member is a bolt clinched to the lower connection cap. In this case, the bolt may include: a head; a first protrusion combined with a surface of the head; a second protrusion combined with a surface of the first protrusion; a third protrusion combined with a surface of the second protrusion; and a body combined with a surface of the third protrusion, and wherein the second protrusion has a diameter smaller than those of the first and third protrusions to provide a receive portion between the first and third protrusions. The bolt may be combined with the lower connection cap by forcible insertion, and the receive portion may be filled with a material of the lower connection cap. The mechanical strength of the lower connection cap may be smaller than that of the bolt.

The rechargeable battery may be a cylindrical lithium rechargeable battery.

According to another aspect of the invention, there is provided a rechargeable battery comprising: i) an electrode assembly including positive and negative electrodes and a separator interposed therebetween; ii) a casing having an opened top face to store the electrode assembly; iii) a cap assembly installed in an upper portion of the casing; iv) an upper connection cap which has a male member and is fixed to the cap assembly; and v) a lower connection cap which has a female member and is fixed to a lower portion of the casing.

According to still another aspect of the invention, there is provided a battery module comprising: a plurality of rechargeable batteries described in the aforementioned aspect; and at least one interconnection member which is combined with the upper connection cap of one of the rechargeable batteries and the lower connection cap of an adjacent rechargeable battery to interconnect adjacent rechargeable batteries with each other.

A plurality of the rechargeable batteries may be arranged in series such that the upper connection cap of one of the rechargeable batteries and the lower connection cap of an adjacent rechargeable battery face the same direction.

The interconnection member may be detachably combined with the upper and lower connection caps using a fixation device. The interconnection member may include a first thru-hole connected with a hole of the nut and a second thru-hole into which the bolt is inserted. The fixation device may include a fixation bolt which is inserted into the first thru-hole and combined with the nut and a fixation nut combined with the bolt.

A plurality of the rechargeable batteries may be interconnected with one another in series.

According to still further another aspect of the invention, there is provided a battery module comprising: a plurality of rechargeable batteries, each of the rechargeable batteries including: an electrode assembly having positive and negative electrodes and a separator interposed therebetween, a casing which stores the electrode assembly, and upper and lower connection caps installed in upper and lower portions, respectively, of the casing, and fastening members clinched to upper and lower connection caps respectively; and at least one interconnection member connected to the fastening members of adjacent rechargeable batteries to interconnect the adjacent rechargeable batteries with each other.

According to still further another aspect of the invention, there is provided a battery module comprising: a first rechargeable battery including an upper connection cap with which a female member is combined; a second rechargeable batter including a lower connection cap with which a male member is combined; and an interconnection member which is combined with the upper and lower connection caps to interconnect the first and second rechargeable batteries with each other.

The female member may be clinched to the upper connection cap, and the male member may be clinched to the lower connection cap. The first and second rechargeable batteries may be arranged in series such that the upper connection cap of the first rechargeable battery and the lower connection cap of the second rechargeable battery face the same direction.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE EMBODIMENTS

Figure 1:
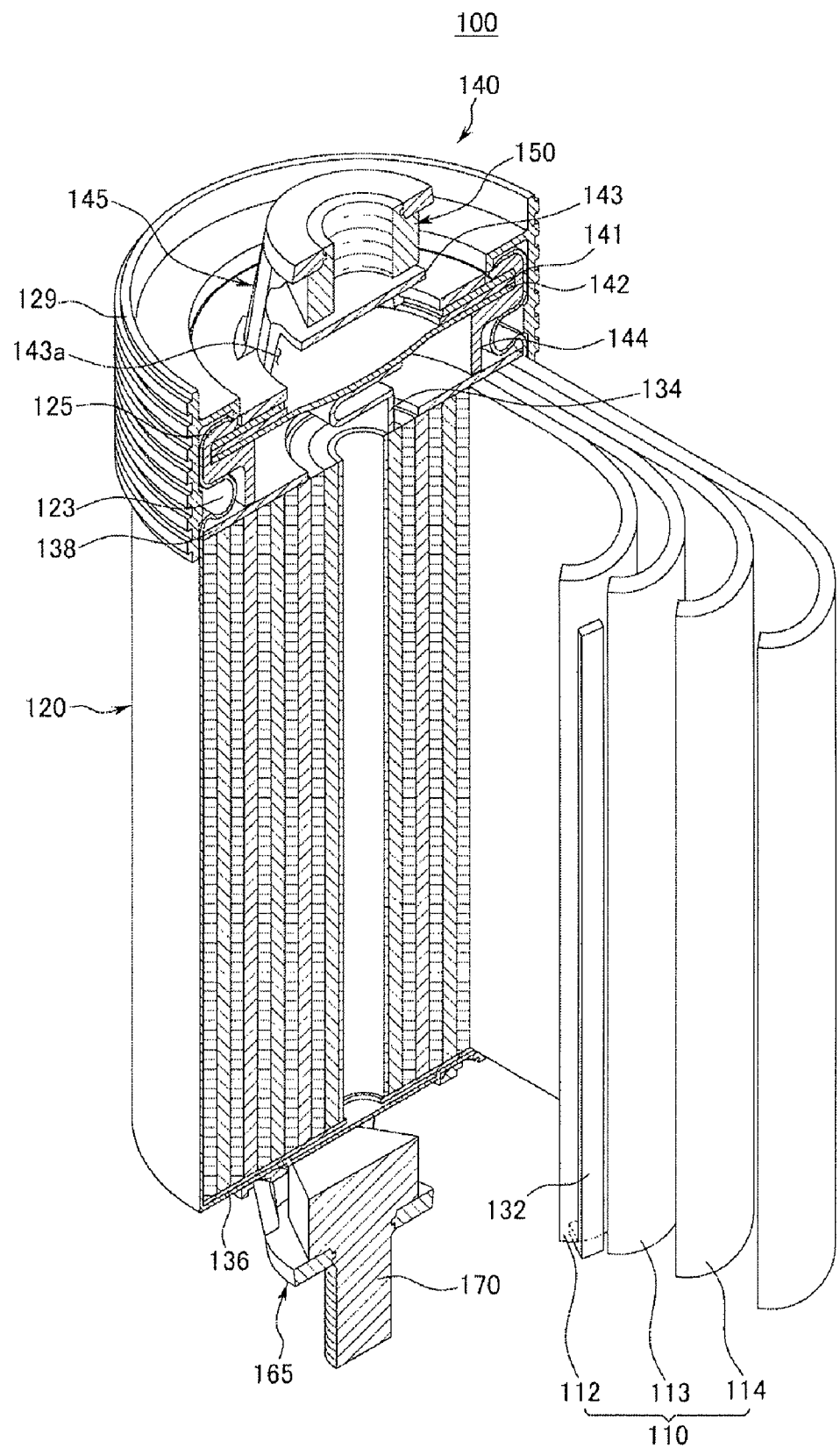
FIG. 1 is a cross-sectional perspective view illustrating a rechargeable battery according to an embodiment of the invention.

Hereinafter, exemplary embodiments of the invention will be described in detail with reference to the attached drawings such that the invention can be easily put into practice by those skilled in the art. However, the invention is not limited to the embodiments described herein, but may be embodied in various forms. Elements that do not correspond to the invention will not be described in order to provide simplified description for the invention in association with the drawings. Like reference numerals denote like elements throughout the entire specification. Also, elements already well known in the art will not be described in detail.

FIG. 1 is a cross-sectional perspective view illustrating a rechargeable battery 100 according to an embodiment of the invention. The rechargeable battery 100 is a lithium ion rechargeable battery, but the invention is not limited thereto.

Referring to FIG. 1, the rechargeable battery includes an electrode assembly 110, a casing 120, a cap assembly 140, an upper connection cap 145, a lower connection cap 165, an insulation cover 129, and a center pin (not shown).

The electrode assembly 110 includes a negative electrode 112 formed by attaching a negative activation material onto a charge collector, a positive electrode 114 formed by attaching a positive activation material onto a charge collector, and a separator 113 interposed between the positive and negative electrodes 114 and 112 to prevent a short-circuit therebetween.

More specifically, the negative electrode 112 is manufactured by coating a slurry type activation material layer obtained by mixing a negative activation material powder, a negative binder, a bond, and the like on a charge collector such as a copper plate. In this case, the negative activation material may include a carbon material selected from a group consisting of natural graphite, artificial graphite, graphited carbon, non-graphited carbon, and a combination thereof as a main composition. In addition, a negative tap 132 is combined with the negative electrode 112 and makes contact with an internal bottom surface of the casing 120. As a result, the casing 120 can function as a negative electrode. Needless to say, it would be apparent to those skilled in the art that a negative charge collector (not shown) instead of the negative tap 132 may be connected with the negative electrode 112.

The positive electrode 114 is manufactured by coating a slurry type activation material layer obtained by mixing a positive activation material powder, a positive binder, a positive conductive additive, and the like on a charge collector such as an aluminum plate. The positive activation material may include a lithium metal oxide selected from a group consisting of $LiCoO_2$, $LiMnO_2$, $LiNiO_2$, $LiCrO_2$, and $LiMn_2O_4$. A positive tap 134 is combined with the positive electrode 114, extracted from the positive electrode 114, and then connected with a safety vent 142 of the cap assembly 140. Needless to say, a positive charge collector (not shown) instead of the positive tap 134 may be connected with the positive electrode 114. In this case, a lead tap (not shown) of the positive charge collector is connected with the cap assembly 140.

The separator 113 separates the positive and negative electrodes 112 and 114 from each other, and provides a circulation path for the lithium ions. The separator 113 may be a single layered film formed of polyethylene, polypropylene, or polyvinylidene fluoride, a multi-layered film having two or more layers formed thereof, or a mixed multi-layered film such as a polyethylene/polypropylene double layered separator, a polyethylene/polypropylene/polyethylene triple layered film, and a polypropylene/polyethylene/polypropylene triple layered separator.

The electrode assembly 110 may be obtained by sequentially stacking the negative electrode, the separator 113, and the positive electrode 114, combining a center rod (not show) with the end of the stack, and winding them in a cylindrical shape. The obtained electrode assembly 110 may be inserted into a casing 120, which will be described later, and then, the center rod 110 may be separated from the electrode assembly 110. A vacant space generated by separating the center rod may be filled with a center pin (not shown). The center pin is to prevent electrode assembly deformation which can be generated during the charge/discharge operations of the rechargeable batteries 100, and may have a cylindrical shape to fit into the vacant space. Such a center pin may be formed of metal such as iron, copper, nickel, and nickel alloy, or polymer.

Meanwhile, upper and lower insulation plates 138 and 136 are installed on upper and lower sides, respectively, of the aforementioned electrode assembly 110 in order to prevent an unnecessary electrical short between the electrode assembly 110 and the casing 120.

The casing 120 includes an internal space for storing the electrode assembly 110 in a cylindrical shape. The casing 120 has an opened top surface, into which the electrode assembly 110 can be inserted. The casing 120 also includes a bead portion 123 and a crimped portion 125 in order to fix the cap assembly 140 and the electrode assembly 110 positioned in its internal space. The cap assembly 140 seals the casing 120 as will be described below in detail. The internal space of the sealed casing 120 is filled with electrolyte (not shown), which allows the lithium ions generated by an electrochemical response to move between the positive and negative electrodes 112 and 114 during the charge/discharge operations.

The cap assembly 140 includes an electrode cap 143, a positive temperature coefficient element 141, a safety vent 142, and a gasket 144, and is installed on top of the opened casing 120 to seal it.

The gasket 144 covers side surfaces of the conductive electrode cap 143, the positive temperature coefficient element 141, and the safety vent 142 to insulate them from the casing 120.

The safety vent 142 has a lower surface where a positive electrode tap 134 extracted from the positive electrode 114 is attached using a bonding process such as welding. The safety vent 142 is upwardly switched to cut off electrical connection with the positive electrode 114 when the internal pressure of the rechargeable battery 100 exceeds a predetermined value. Although the safety vent 142 and the positive electrode tap 134 are directly connected with each other in the embodiment, it would be apparent to those skilled in the art that an insulation member (not shown) and a cap plate (not shown) may be further sequentially stacked under the safety vent 142, and the positive electrode tap 134 may be combined with the cap plate.

The positive temperature coefficient element 141 is electrically and mechanically connected with an upper portion of the safety vent 142. The electrical resistance of the positive temperature coefficient element 141 increases to a nearly infinite level when its temperature increases over a predetermined level. Therefore, it can be used to stop a charge/discharge current flow when the temperature of the rechargeable battery 100 increases over a predetermined level. When the temperature of the rechargeable battery 100 is decreased under a predetermined level, the electrical resistance of the positive temperature coefficient element 141 is reduced again. Accordingly, the function of the rechargeable battery 100 can be recovered.

The rechargeable battery 100 according to the embodiment may further include a separate safety means in addition to the aforementioned safety vent 142 and the positive temperature coefficient element 141 in order to prevent abnormal conditions caused by an excessive charge/discharge operation, a significantly high temperature, an overflow current, and the like.

The electrode cap 143 is connected with an upper portion of the positive temperature coefficient element 141 to externally apply the current. The side face of the electrode cap 143 has a first degassing hole 143a which allows internal gas of the rechargeable battery 100 to be ventilated when the safety vent 142 is broken down.

The upper connection cap 145 is fixed to the electrode cap 143 using a welding process such as resistance welding or laser welding. The lower connection cap 165 is fixed to the lower surface of the casing 120 using a welding process such as resistance welding or laser welding. According to the embodiment, the upper and lower connection caps 145 and 165 have the same shape and are made of the same material. Needless to say, the upper and lower connection caps 145 and 165 may have shapes different from each other.

The fastening member is installed in the upper and lower connection caps 145 and 165. According to the embodiment, the fastening member includes male and female members. That is, a nut 150 as a female member is installed in the upper connection cap 145, while a bolt 170 as a male member is installed in the lower connection cap 165.

The upper and lower connection caps 145 and 165 and the fastening member are used to construct a battery module together with an interconnection member 185, which will be described below. The upper and lower connection caps 145 and 165 and the fastening member will be described in more detail with reference to FIGS. 2 to 5.

Meanwhile, the insulation cover 129 may be installed to cover an upper circumference of the casing 120. The insulation cover 129 has functions such as insulation between the electrodes, and vibration absorption.

Figure 2:
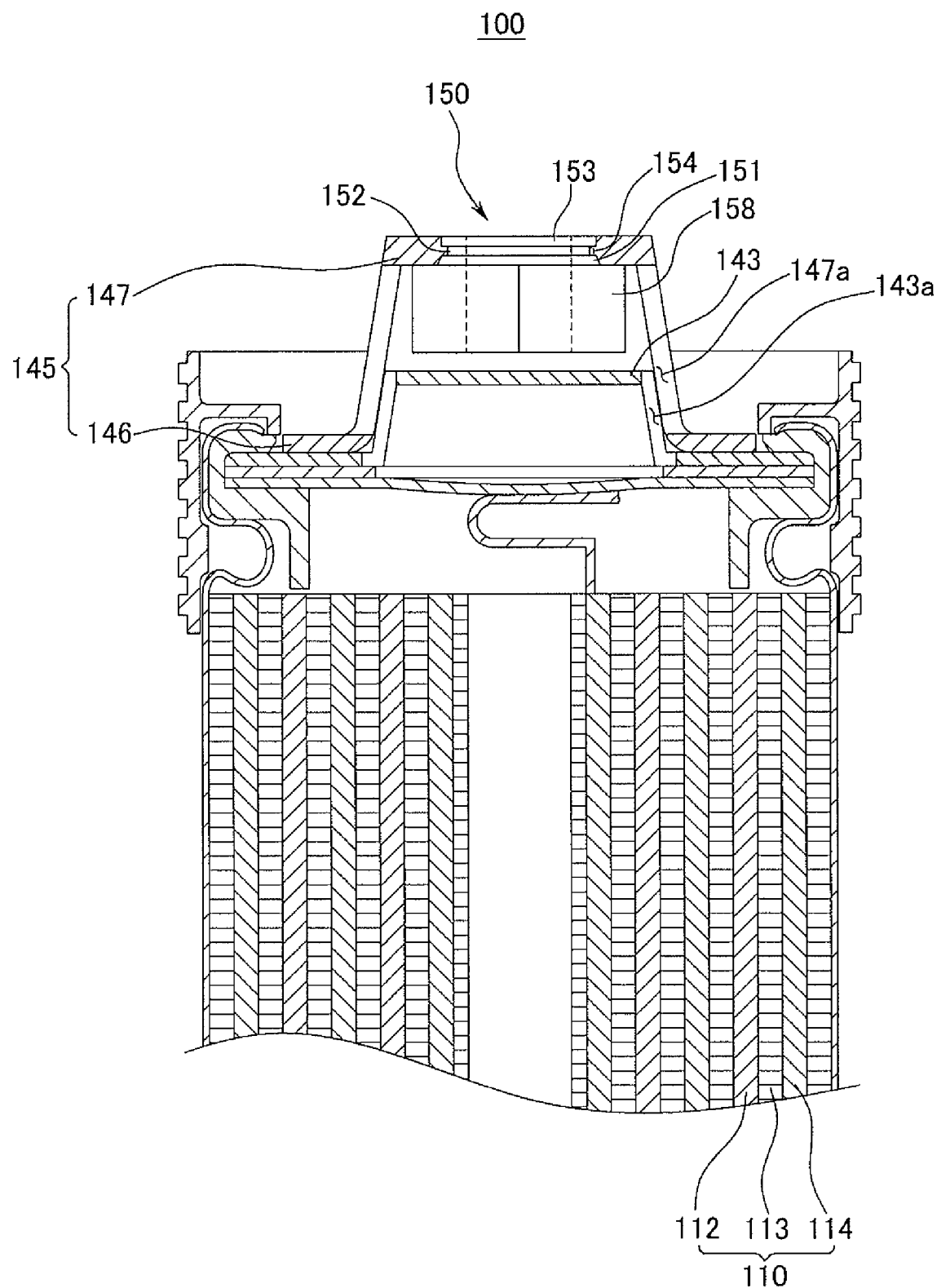
FIG. 2 is a partially cross-sectional view illustrating an upper portion of a rechargeable battery shown in FIG. 1.
Figure 3:
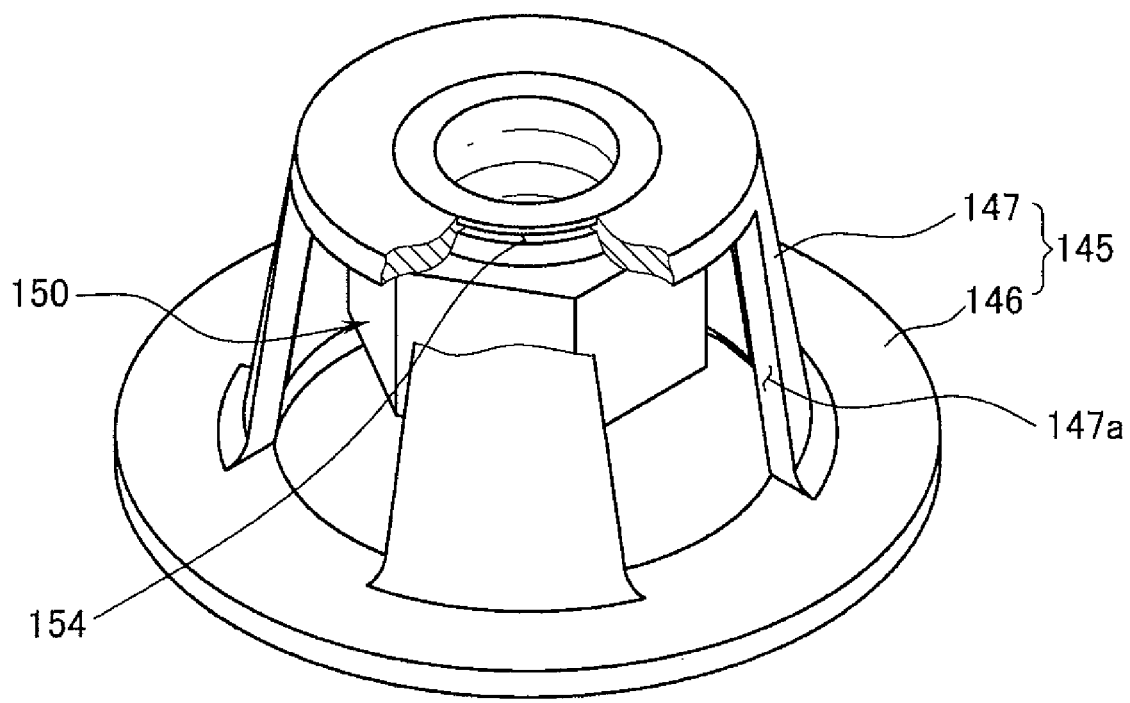
FIG. 3 is an exploded perspective view illustrating an upper connection cap and a female member shown in FIG. 2.

FIG. 2 is a partially cross-sectional view illustrating an upper portion of a rechargeable battery 100 shown in FIG. 1, and FIG. 3 is an exploded perspective view illustrating an upper connection cap 145 and a female member shown in FIG. 2. Referring to FIGS. 2 and 3, the upper connection cap 145 includes a first base section 146 and a first support section 147, and is fixed to the electrode cap 143. The female member is clinched to an inner top surface of the first support section 147. Although a nut 150 is used as a female member according to the embodiment, the invention is not limited thereto.

The first base section 146 has a disk shape of which a center portion is removed. The first base section 146 is fixed to the electrode cap 143 using a welding process such as resistance welding and laser welding. The first support section 147 is protruded from the inner circumference of the first base section 146 at a predetermined height. The height of the first support section 147 may be appropriately adjusted according to the height of the nut 150 which is installed in an inner surface.

Second degassing holes 147a are formed on a side face of the first support section 147 at a predetermined interval. Similarly to the first degassing hole 143a, the second degassing holes 147a allow internal gas of the rechargeable battery 100 to be ventilated when the safety vent 142 is broken down.

The nut 150 includes a head 158, a first protrusion 151 combined with a surface of the head 158, a second protrusion 152 combined with a surface of the first protrusion 151 opposite to the surface where the head 158 is combined, and a third protrusion 153 combined with a surface of the second protrusion 152 opposite to the surface where the first protrusion 151 is combined. In this case, since the second protrusion 152 has a diameter smaller than those of the first and third protrusions 151 and 153, a receive portion 154 is formed between the first and third protrusions 151 and 153.

The nut 150 is installed in the upper connection cap 145 by clinch engagement or forcible insertion. Specifically, a clinch nut 150 is disposed in an inside of the upper connection cap 145, and the clinch nut 150 is forcibly inserted into a gap formed in the upper connection cap 145. Then, a portion of the upper connection cap 145 which receives a compression force is deformed and engaged with the receive portion 154 of the clinch nut 150. As a result, the upper connection cap 145 and the nut 150 can be robustly combined with each other. Since such a clinch engagement method is known in the art, its detailed description will not be described herein.

Due to the clinch engagement process, it is possible to provide a simpler engagement process and reduce a time for the engagement process in comparison with a typical welding process.

For such a clinch engagement, the mechanical strength of the upper connection cap 145 is preferably smaller than that of the nut 150. For example, the upper connection cap 145 may be formed of mild steel. Although the aforementioned nut 150 is just an example of the invention, and various kinds of clinch nuts well known in the art can be used in the rechargeable battery 100 according to the embodiment.

Figure 7:
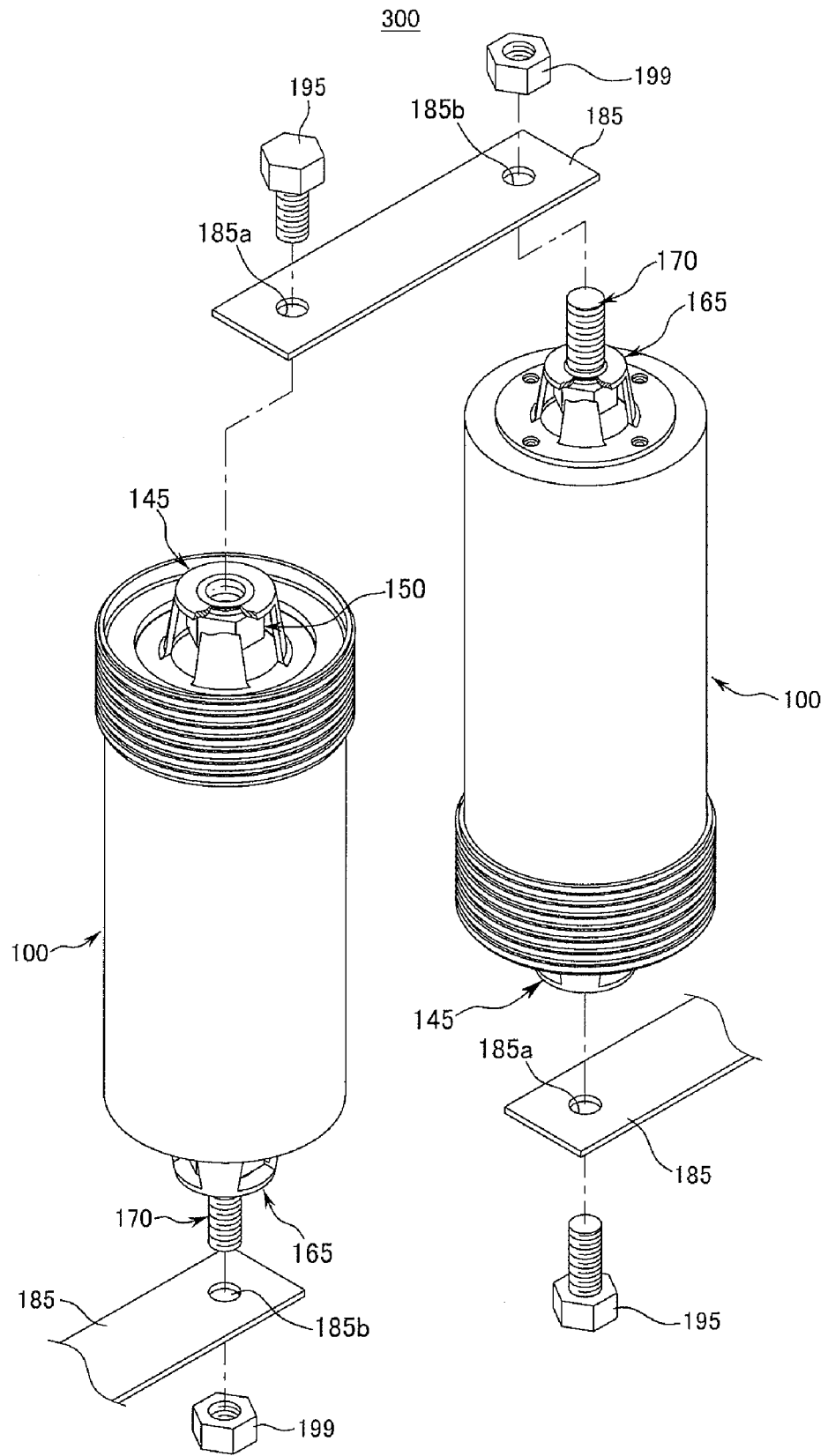
FIG. 7 is a perspective view illustrating a battery module constructed of a plurality of rechargeable batteries shown in FIG. 1.

The nut 150 is to be engaged with a fixation bolt 195 (refer to FIG. 7) when a plurality of rechargeable batteries 100 are combined to provide a battery module 300 (refer to FIG. 7). The engagement between the nut 150 and the bolt 195 will be described in detail below.

Figure 4:
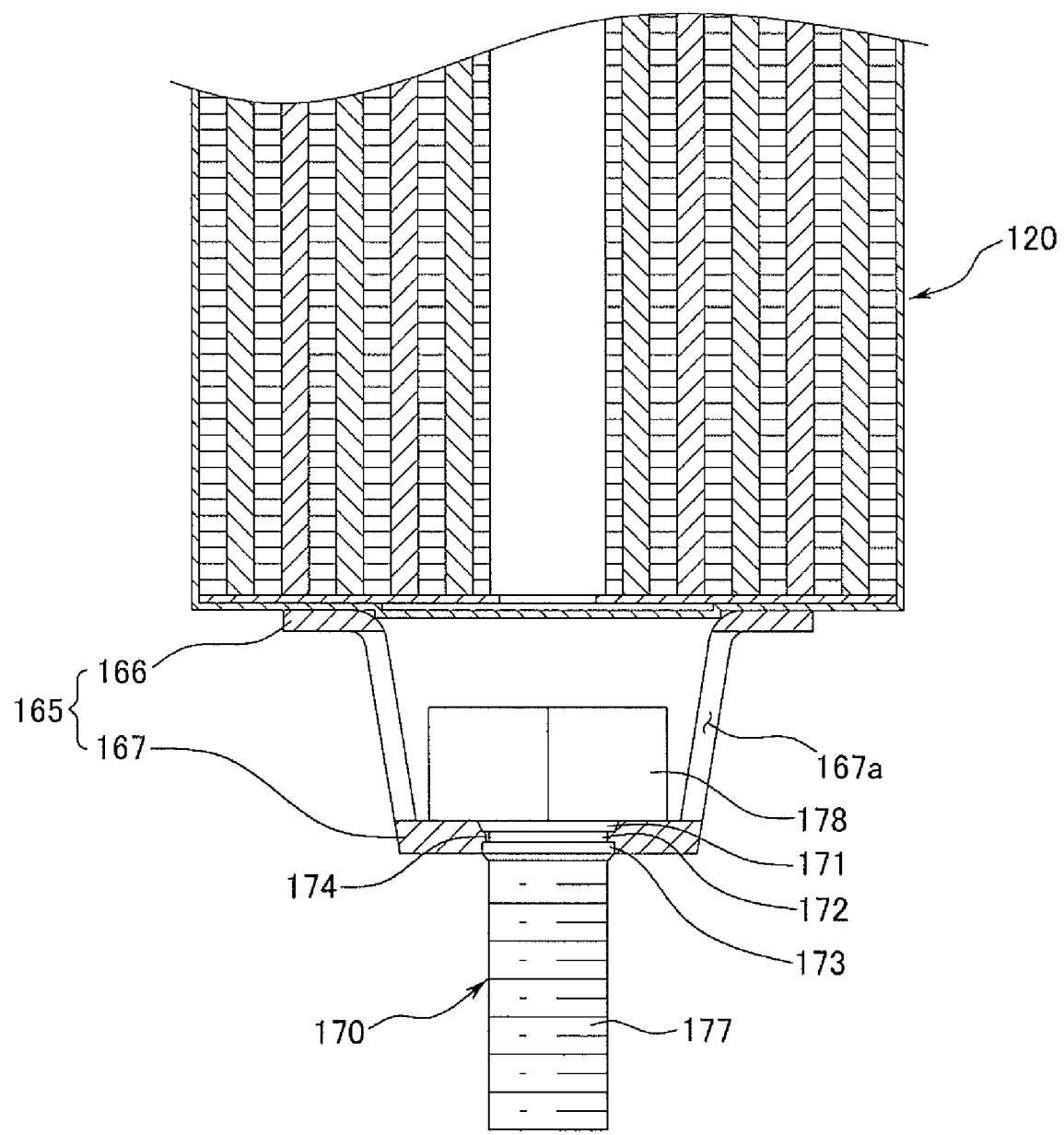
FIG. 4 is a partially cross-sectional view illustrating a lower portion of a rechargeable battery shown in FIG. 1.
Figure 5:
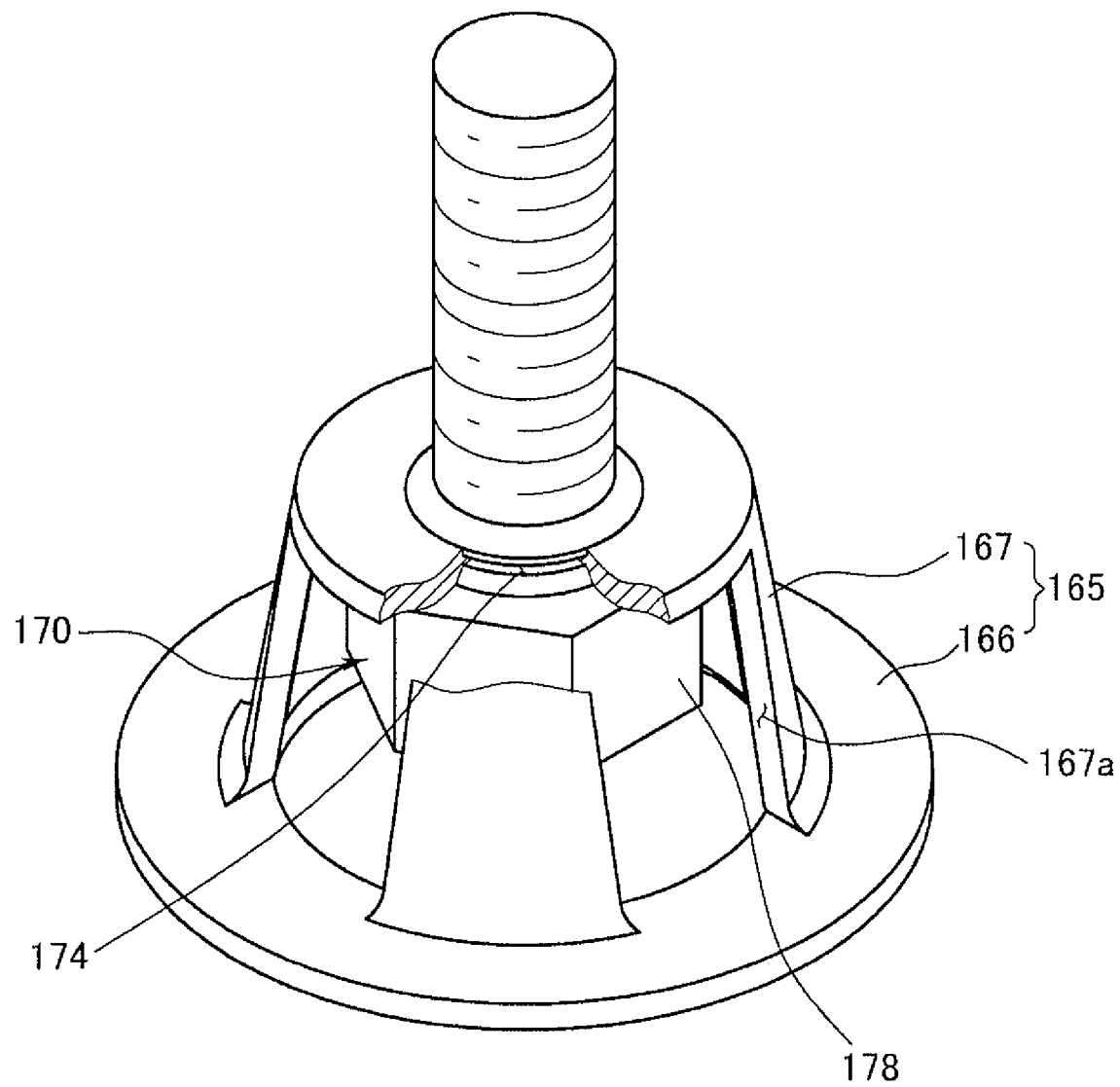
FIG. 5 is an exploded perspective view illustrating a lower connection cap and a male member shown in FIG. 4.

FIG. 4 is a partially cross-sectional view illustrating a lower portion of a rechargeable battery 100 shown in FIG. 1, and FIG. 5 is an exploded perspective view illustrating a lower connection cap 145 and a male member shown in FIG. 4. Now, the lower connection cap 165 and the male member will be described in detail with reference to FIGS. 4 and 5.

The lower connection cap 165 includes a second base section 166 and a second support section 167. The lower connection cap 165 is fixed to a lower surface of the casing 120. The male member extends from the inside of the second support section 167 to the outside in a perforated manner. Although a bolt 170 is used as the male member in the embodiment, the invention is not limited thereto.

The second base section 166 has a disk shape of which a center portion is removed. The second base section 166 is fixed to a lower surface of the casing 120 using a welding process such as resistance welding and laser welding. The second support section 167 is protruded from an inner circumference of the second base section 166 at a predetermined height. Although holes 167a are formed on a side face of the second support section 167 at a predetermined interval in the embodiment, no hole 167 may be formed on the second support section 167 which is fixed to a lower surface of the casing 120.

The bolt 170 includes a head 178, a first protrusion 171 combined with a surface of the head 178, a second protrusion 172 combined with a surface of the first protrusion 171 opposite to the surface where the head is combined, a third protrusion 173 combined with a surface of the second protrusion 172 opposite to the surface where the first protrusion 171 is combined, and a body 177 combined with a surface the third protrusion 173 opposite to the surface where the second protrusion 172 is combined. In this case, since the second protrusion 172 has a diameter smaller than those of the first and third protrusions 171 and 173, a receive portion 174 is provided between the first and third protrusions 171 and 173. Threads are formed on a surface of the body 177 for engagement with a fixation nut 199 (refer to FIG. 7).

The bolt 170 is installed in the lower connection cap 165 using clinch engagement (i.e., forcible insertion). The installation method is similar to the installation between the nut 150 and the upper connection cap 145, and the installation method will not be described in detail. Due to the clinch engagement process, it is possible to provide simpler engagement and reduce a time for the engagement in comparison with a typical welding process. For such a clinch engagement process, the mechanical strength of the lower connection cap 165 is preferably smaller than that of the bolt 170. In addition, the bolt 170 is just an example of the invention, and various kinds of clinch bolts widely known in the art can be used in the second battery 100 according to the embodiment.

The bolt 170 is engaged with the fixation nut 199 (refer to FIG. 7) when a plurality of rechargeable batteries 100 are combined to provide a battery module 300 (refer to FIG. 7). Engagement between the bolt 170 and the fixation nut 199 will be described in detail below.

Figure 6:
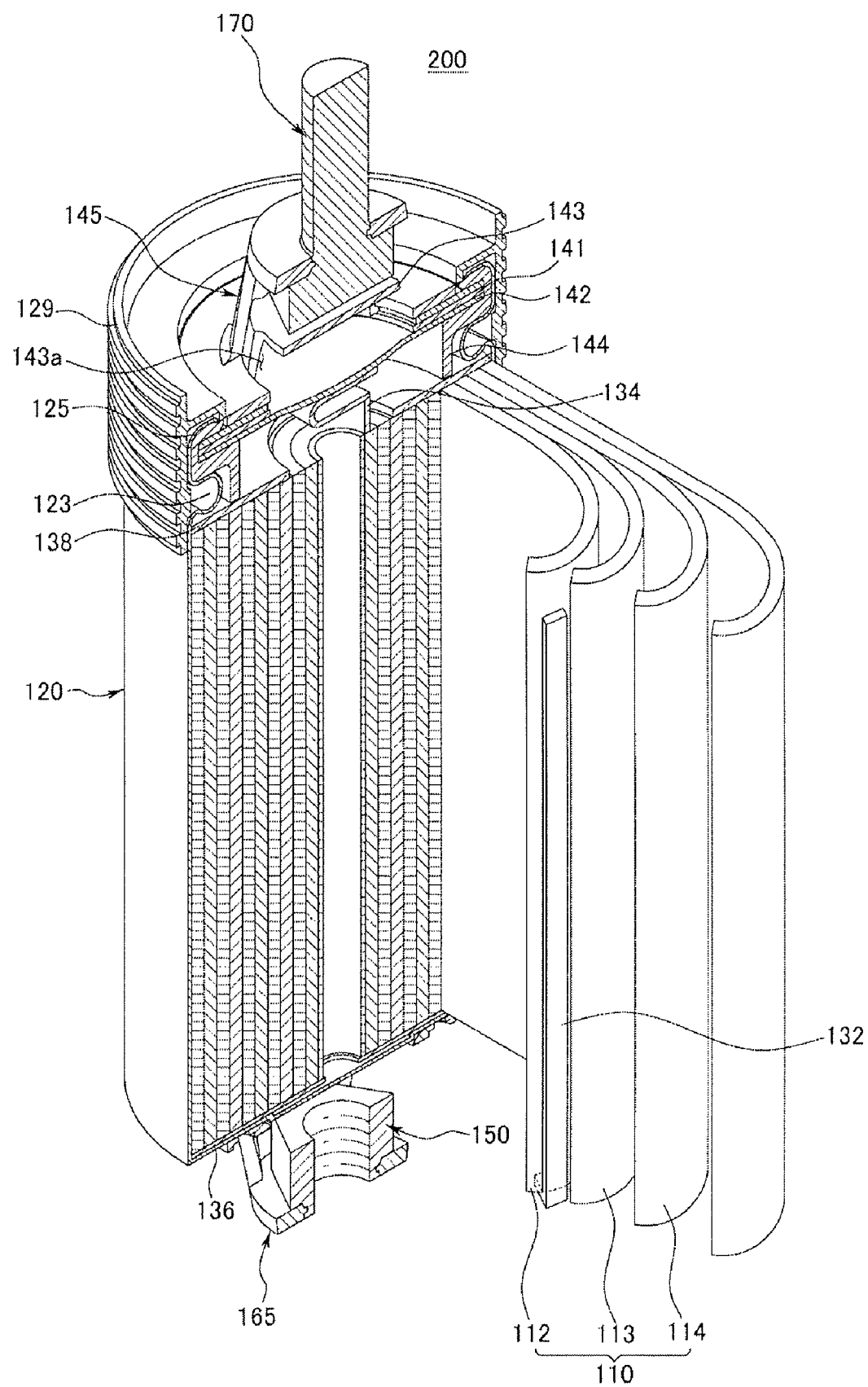
FIG. 6 is a cross-sectional perspective view illustrating a rechargeable battery according to another embodiment of the invention.

FIG. 6 illustrates a rechargeable battery 200 according to another embodiment of the invention. Referring to FIG. 6, the bolt 170 is clinched to the upper connection cap 145, and the nut 150 is clinched to the lower connection cap 165. Except for this construction, the rechargeable battery 200 shown in FIG. 6 is similar to that of the aforementioned embodiment.

FIG. 7 is a perspective view illustrating a battery module 300 manufactured by connecting a plurality of rechargeable batteries 100 having the aforementioned construction. Although a pair of rechargeable batteries 100 are shown in FIG. 7 for simple description, more rechargeable batteries 100 can be connected. Referring to FIG. 7, a pair of rechargeable batteries 100 are connected using an interconnection member 185.

A pair of the rechargeable batteries 100 are oppositely arranged. That is, a pair of the rechargeable batteries 100 are arranged in series such that the upper connection cap 145 of a rechargeable battery 100 and the lower connection cap 165 of the adjacent rechargeable battery 100 face the same direction. Then, an interconnection member 185 is disposed across the upper connection cap 145 of a rechargeable battery 100 and the lower connection cap 165 of the other rechargeable battery 100.

The interconnection member 185 is a conductor for interconnecting a plurality of rechargeable batteries 100, and may be formed in various shapes. For example, the interconnection member 185 of the embodiment has a rectangular panel shape. First and second thru-holes 185a and 185b are formed on both ends of the interconnection member 185, respectively. The first thru-hole 185a is connected with the hole of the nut 150 installed in the upper connection cap 145, and the second thru-hole 185b is inserted into the bolt 170 installed in the lower connection cap 165. Then, the interconnection member 185 is fixed to the upper and lower connection caps 145 and 165 using a fixation bolt 195 engaged with the nut 150 and a fixation nut 199 engaged with the bolt 170.

As described above, the interconnection member 185 is fixed to the upper connection cap 145 of a rechargeable battery 100 and to the lower connection cap 165 of the adjacent rechargeable battery 100. Therefore, a plurality of rechargeable batteries 100 are electrically connected in series. That is, a battery module 300 is constructed by interconnecting a plurality of rechargeable batteries 100 using the upper and lower connection caps 145 and 165, nuts 150 and bolts 170 installed in the upper and lower connection caps 145 and 165, the interconnection members 185, and the fixation bolts 195 and nuts 199. A plurality of rechargeable batteries 100 may be electrically connected in parallel.

Meanwhile, the mechanical strength of the upper connection cap 145 is preferably smaller than that of the electrode cap 143. The upper connection cap 145 can elastically respond to a predetermined force applied to the nut 150 installed in the upper connection cap 145 to fasten the fixation bolt 195. Therefore, the electrode cap 143 disposed under the upper connection cap 145 can be safely protected from the predetermined force.

Figure 8:
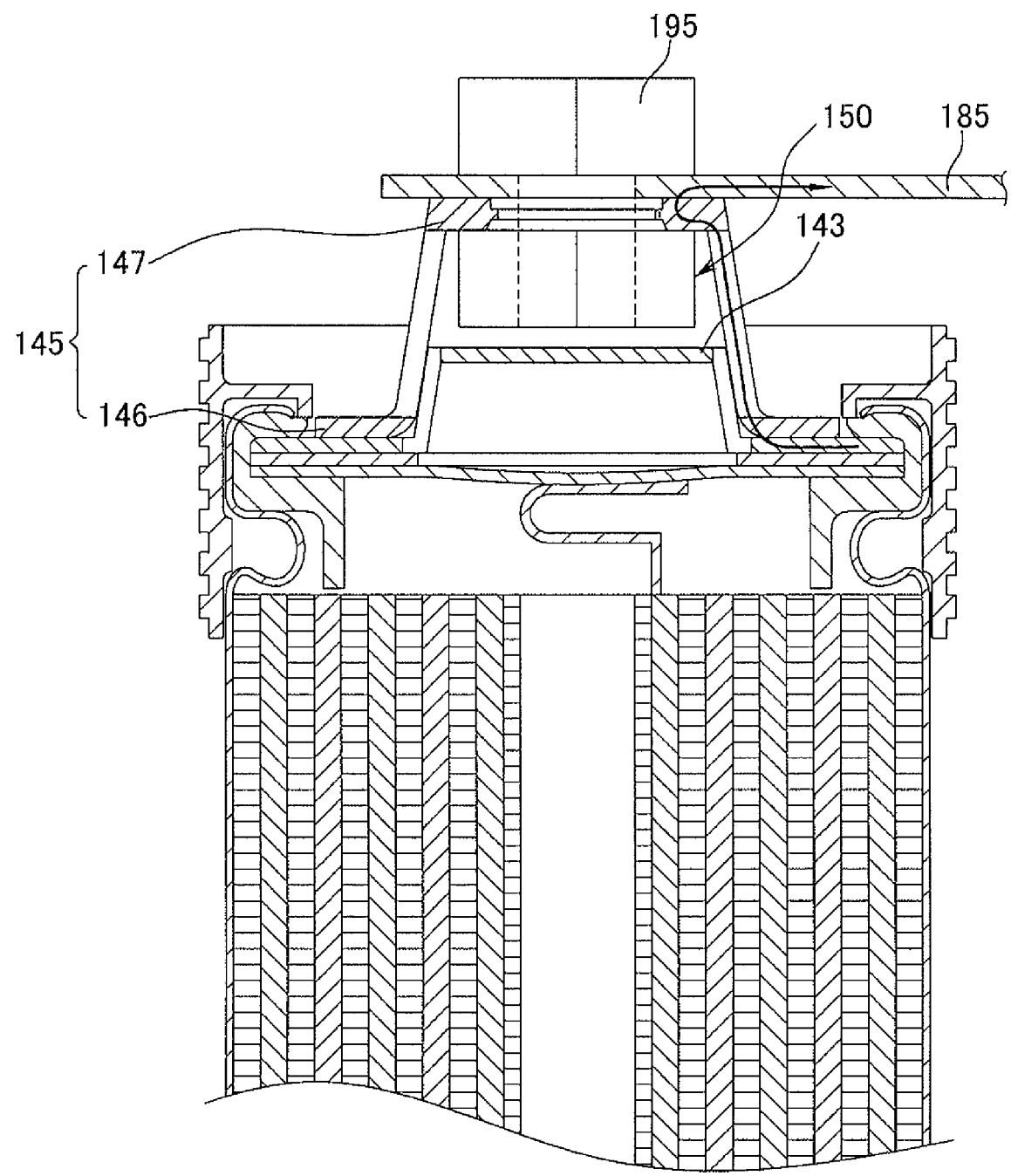
FIG. 8 is a partially cross-sectional view illustrating a current flow in a rechargeable battery shown in FIG. 1.

Referring to FIG. 8, in the rechargeable battery 100 according to an embodiment of the invention, a current flows to the electrode cap 143, to the upper connection cap 145, and to the interconnection member 185 (as shown as an arrow in the drawing), and does not flow to the nut 150 installed in the inner surface of the upper connection cap 145. As a result, according to the embodiment of the invention, an electrical resistance caused by the nut 150 can be reduced. In addition, it is not necessary to consider the electrical resistance of the nut 150 during the design stage of the battery module 300. Therefore, it is possible to reduce design burdens.

As described above, according to an embodiment of the invention, since male and female members that can be discriminated from each other are engaged with the upper and lower connection caps, it is possible to readily discriminate the positive and negative electrodes of the rechargeable battery in a short time. Furthermore, since the positive and negative electrodes can be readily discriminated, it is possible to prevent a problem that can occur when the interconnection member is erroneously installed. Moreover, it is possible to reduce a time for discriminating the positive and negative electrodes of the rechargeable battery. Therefore, it is possible to improve productivity of the battery module and the rechargeable battery.

In addition, according to an embodiment of the invention, a fastening member is engaged with the upper and lower connection caps. Such an engagement process is simpler and easier than a usual welding process. Furthermore, an engagement process time can be reduced due to clinch engagement. This contributes to reduction of a manufacturing time of the rechargeable battery and the battery module and improvement of productivity.

In addition, according to an embodiment of the invention, since the fastening member is engaged with the upper and lower connection caps just by forcible insertion, it is possible to reduce a manufacturing cost of the rechargeable battery and the battery module in comparison with the related art which has used a welding process.

Since the fastening member is engaged with the upper and lower connection members by forcible insertion, it is possible to prevent degradation of material properties of the fastening member and the upper and lower connection caps, which may be caused by welding heat. Also, since welding traces are not remained in the fastening member and the upper and lower connection caps, it is possible to provide clean appearance.

Furthermore, since the clinch engagement has a stronger engagement force in comparison with a usual welding process, the engaged portion between the fastening member and the upper and lower connection caps can have high resistant to an external force.

Although the exemplary embodiments of the invention have been described, the invention is not limited to the embodiments, but may be modified in various forms without departing from the scope of the appended claims, the detailed description, and the accompanying drawings of the invention. Therefore, it is natural that such modifications belong to the scope of the invention.

What is claimed is:

1. A rechargeable battery device comprising:
an electric cell comprising a casing, a positive electrode, and a negative electrode;
a top connection cap electrically connected to the positive electrode; and
a bottom connection cap electrically connected to the negative electrode,
wherein the top connection cap comprises a first mechanical fastener of a first kind that comprises a female member fixedly engaged with an inner surface of the top connection cap, and configured to be fastened to a removable mechanical fastener of a second kind,
wherein the bottom connection cap comprises a second mechanical fastener of a second kind that comprises a male member having a head portion fixedly engaged with an inner surface of the bottom connection cap and having a threaded portion extending away from an inner surface of the bottom connection cap, and configured to be fastened to a removable mechanical fastener of the first kind, said first and second kinds of mechanical fasteners being adapted to fasten in different manners.

2. The device of claim 1, wherein the female member comprises a nut, wherein the nut comprises:
a head;
a threaded hole; and
a locking portion extended from the head.

3. The device of claim 2, wherein the top connection cap further comprises:
a first base section which is fixed to the positive electrode and comprises a center hole; and
a first support section which protrudes from the first base section and comprises a top portion, a side portion, and a center hole provided on the top portion.

4. The device of claim 3, wherein the nut is clinched to the first support section, and wherein the locking portion of the nut is clinched to the center hole of the first support section.

5. The device of claim 4, wherein the nut is combined with the top connection cap by a forced insertion into the center hole of the first support section, and wherein the mechanical strength of the first support section is lower than the that of the locking portion of the nut.

6. The device of claim 2, wherein the male member comprise a bolt, wherein the bolt comprises:
a head;
a locking portion extended from the head; and
a threaded pole.

7. The device of claim 6, wherein the bottom connection cap further comprises:
a second base section which is fixed to the negative electrode and comprises a center hole; and
a second support section which protrudes from the second base section and comprises a top portion, a side portion, and a center hole provided on the top portion.

8. The device of claim 7, wherein the bolt is clinched to the center hole of the second support section, wherein the locking portion of the bolt is clinched to the second support section.

9. The device of claim 8, wherein the bolt is combined with the bottom connection cap by a forced insertion into the center hole of the second support section, and wherein the mechanical strength of the second support section is lower than the that of the locking portion of the bolt.

10. A battery module device comprising:
a plurality of rechargeable batteries comprising a first battery and a second battery, wherein each of the first and second batteries comprises:

an electric cell comprising a casing, a positive electrode, and a negative electrode;
a top connection cap electrically connected to the positive electrode; and
a bottom connection cap electrically connected to the negative electrode,
wherein the top connection cap comprises a first mechanical fastener of a first kind that comprises a female member fixedly engaged with an inner surface of the top connection cap, and configured to be fastened to a removable mechanical fastener of a second kind, wherein the bottom connection cap comprises only a second mechanical fastener of a second kind that comprises a male member having a head portion fixedly engaged with an inner surface of the bottom connection cap and having a threaded portion extending away from an inner surface of the bottom connection cap, and configured to be fastened to a removable mechanical fastener of the first kind, said first and second kinds of mechanical fasteners being adapted to fasten in different manners; and
one or more interconnection members, one of which detachably interconnects an electrode of the first battery and an electrode of the second battery.

11. The device of claim 10, wherein the interconnection member comprises a first connecting portion and a second connecting portion.

12. The device of claim 10, wherein the first connecting portion is configured to be connected to the female member of the first battery, and wherein the second connecting portion is configured to be connected to the male member of the second battery.

13. The device of claim 10, wherein the female member comprises a nut, wherein the male member comprises a bolt.

14. The device of claim 13, wherein the interconnection member is detachably combined with the top and bottom connection caps using a fixation device.

15. The device of claim 14, wherein the interconnection member includes:
a first thru-hole connected with a hole of the nut; and
a second thru-hole into which the bolt is inserted,
wherein the fixation device includes a fixation bolt which is inserted into the first thru-hole and combined with the nut and a fixation nut combined with the bolt.

16. A battery module device comprising:
a first battery;
a second battery;
a third battery;
wherein each of the first, second and third batteries comprises:
an electric cell comprising a casing, a positive electrode, and a negative electrode;
a top connection cap electrically connected to the positive electrode; and
a bottom connection cap electrically connected to the negative electrode,
wherein the top connection cap comprises a first mechanical fastener of a first kind that comprises a female member fixedly engaged with an inner surface of the top connection cap, and configured to be fastened to a removable mechanical fastener of a second kind, wherein the bottom connection cap comprises a second mechanical fastener of a second kind that comprises a male member having a head portion fixedly engaged with an inner surface of the bottom connection cap and having a threaded portion extending away from an inner surface of the bottom connection cap, and configured to be fastened to a removable mechanical fastener of the first kind, said first and second kinds of mechanical fasteners being adapted to fasten in different manners;
a first interconnection member comprising first and second connecting portions;
a second interconnection member comprising first and second connecting portions;
a third interconnection member comprising first and second connecting portions;
and
a fourth interconnection member comprising first and second connecting portions.

17. The device of claim 16, wherein the second connecting portion of the first interconnection member is connected to the top connection cap of the first battery, wherein the first connecting portion of the second interconnection member is connected to the bottom connection cap of the first battery, wherein the second connecting portion of the second interconnection member is connected to the top connection cap of the second battery, wherein the first connecting portion of the third interconnection member is connected to the bottom connection cap of the second battery, wherein the second connecting portion of the third interconnection member is connected to the top connection cap of the third battery, and wherein the first connecting portion of the fourth interconnection member is connected to the bottom connection cap of the third battery.

18. A battery module comprising:
a plurality of rechargeable batteries, each of the rechargeable batteries including:
an electrode assembly having positive and negative electrodes and a separator interposed therebetween,
a casing which stores the electrode assembly,
upper and lower connection caps installed in upper and lower portions, respectively, of the casing, and
fastening members clinched to upper and lower connection caps respectively; and
at least one interconnection member connected to the fastening members of adjacent rechargeable batteries to interconnect the adjacent rechargeable batteries with each other;
wherein the top connection cap comprises a first mechanical fastener of a first kind that comprises a female member fixedly engaged with an inner surface of the top connection cap, and configured to be fastened to a removable mechanical fastener of a second kind, wherein the bottom connection cap comprises a second mechanical fastener of a second kind that comprises a male member having a head portion fixedly engaged with an inner surface of the bottom connection cap and having a threaded portion extending away from an inner surface of the bottom connection cap, and configured to be fastened to a removable mechanical fastener of the first kind, said first and second kinds of mechanical fasteners being adapted to fasten in different manners.

19. The rechargeable battery device of claim 1, wherein the second mechanical fastener is configured to be coupled to an external mechanical fastener.

20. The rechargeable battery device of claim 19, wherein the external mechanical fastener comprises an external nut.

* * * * *